US011220148B2

(12) United States Patent
Lee (10) Patent No.: US 11,220,148 B2
(45) Date of Patent: Jan. 11, 2022

(54) CASTER ANGLE ADJUSTMENT DEVICE FOR VEHICLE

(71) Applicants: Hyundai Motor Company, Seoul (KR); Kia Motors Corporation, Seoul (KR)

(72) Inventor: Hae Seong Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/849,669

(22) Filed: Apr. 15, 2020

(65) Prior Publication Data

US 2021/0162827 A1   Jun. 3, 2021

(30) Foreign Application Priority Data

Nov. 28, 2019  (KR) .................. 10-2019-0155902

(51) Int. Cl.
*B60G 7/00* (2006.01)
*B62D 17/00* (2006.01)

(52) U.S. Cl.
CPC ............ *B60G 7/003* (2013.01); *B60G 7/006* (2013.01); *B62D 17/00* (2013.01); *B60G 2200/464* (2013.01); *B60G 2204/143* (2013.01); *B60G 2204/148* (2013.01); *B60G 2206/111* (2013.01)

(58) Field of Classification Search
CPC .. B60G 7/003; B60G 7/006; B60G 2206/111; B60G 2200/464; B60G 2204/148; B60G 2204/143; B62D 17/00
See application file for complete search history.

(56) References Cited

U.S. PATENT DOCUMENTS

| 4,371,191 | A | * | 2/1983 | Goldberg | B60G 3/26 280/5.501 |
|---|---|---|---|---|---|
| 5,472,225 | A | * | 12/1995 | Harara | B60G 3/20 280/86.75 |
| 5,557,525 | A | * | 9/1996 | Miichi | B60G 3/26 701/33.4 |
| 5,975,541 | A | * | 11/1999 | Harara | F16F 13/28 280/5.524 |
| 6,782,731 | B2 | * | 8/2004 | Lee | B60G 3/00 73/11.07 |

(Continued)

FOREIGN PATENT DOCUMENTS

| GB | 2279049 A | * | 12/1994 | ............ B60G 7/006 |
|---|---|---|---|---|
| JP | 62080173 A | * | 4/1987 | ............ B62D 7/146 |

(Continued)

*Primary Examiner* — James A English
*Assistant Examiner* — Kurtis Nielson
(74) *Attorney, Agent, or Firm* — Slater Matsil, LLP (57) ABSTRACT

A caster angle adjustment device for a vehicle includes a variable lower arm connected to multiple points of a subframe via connection parts and connected to a steering knuckle at a single point via one of the connection pails, any one of the connection pails being movably connected to the subframe to be changed in shape, and an actuator provided in the subframe and connected to the connection part movably connected to the subframe and configured to move a position of the connection part, so that a position of the steering knuckle is moved through the shape change of the variable lower arm to change a caster angle.

12 Claims, 6 Drawing Sheets

(56) References Cited

U.S. PATENT DOCUMENTS

| | | | |
|---|---|---|---|
| 2002/0130477 A1* | 9/2002 | Britton | B62D 13/06 280/86.751 |
| 2003/0052467 A1* | 3/2003 | Allman | B60G 3/265 280/86.756 |
| 2005/0067803 A1* | 3/2005 | Inayoshi | B60G 7/02 280/86.75 |
| 2007/0132198 A1* | 6/2007 | Lee | B62D 17/00 280/5.521 |
| 2010/0117313 A1* | 5/2010 | Choi | B60G 7/003 280/5.523 |
| 2015/0054244 A1* | 2/2015 | Seo | B62D 17/00 280/86.752 |
| 2015/0123367 A1 | 5/2015 | Gano | |
| 2015/0224843 A1* | 8/2015 | Luttinen | B60G 3/04 280/86.753 |
| 2015/0226250 A1* | 8/2015 | Luttinen | B62D 17/00 280/86.753 |
| 2017/0072756 A1* | 3/2017 | Dusini | F16C 11/04 |
| 2018/0201319 A1* | 7/2018 | Rogers | B60G 3/26 |
| 2019/0329620 A1* | 10/2019 | Rogers | B62D 17/00 |
| 2019/0367094 A1* | 12/2019 | Seo | B60G 3/202 |
| 2020/0238776 A1* | 7/2020 | Kishida | B60G 7/00 |

FOREIGN PATENT DOCUMENTS

| | | | | |
|---|---|---|---|---|
| JP | 62085705 A | * | 4/1987 | B60G 3/22 |
| JP | 63106118 A | * | 5/1988 | B60G 7/006 |
| JP | 63159116 A | * | 7/1988 | B60G 7/006 |
| JP | H06127244 A | | 5/1994 | |
| KR | 19980048707 U | | 9/1998 | |

* cited by examiner

CASTER ANGLE ADJUSTMENT DEVICE FOR VEHICLE

CROSS-REFERENCE TO RELATED APPLICATIONS

This application claims priority to Korean Patent Application No. 10-2019-0155902, filed on Nov. 28, 2019, which application is hereby incorporated herein by reference.

TECHNICAL FIELD

The present invention relates to a caster angle adjustment device for a vehicle.

BACKGROUND

Generally, in a caster of a wheel, particularly in a suspension system using struts, a straight line connecting an upper end of the strut and the ball joint of a lower arm is called a kingpin shaft, and an angle at which the extension line of the kingpin shaft intersects with the centerline of the tire is called a caster angle. When the caster angle is formed in the wheel, the straight running performance of the vehicle is improved.

Herein, in the case of a McPherson strut type suspension, the caster angle and trail are determined by a connection point of the upper end of the strut and the lower arm of the steering knuckle. This caster trail is closely related to the handling characteristics of the vehicle. In general, as the caster angle increases, the trail also increases.

That is, when the caster trail is increased, the turning camber is increased by the caster angle, thereby increasing the limit performance of the vehicle and the support rigidity of the tire. Accordingly, as the caster trail increases, the movement due to the lateral force increases, the steering reaction force increases, and the steering feeling is improved. However, since the influence by road slope is also sensitive, characteristics such as vehicle pulling become inferior.

When the caster trail is decreased, there are characteristics that are opposite to the foregoing situations in which the caster trail is increased, for example, a characteristic of being resistant to vehicle pulling due to insensitivity to disturbances such as road slope.

As described above, the vehicle has different running performances according to the caster characteristics. In the related art, as the initially set caster angle is fixed, it is difficult to secure the running performance optimized for various driving situations.

The matters described as the background art are only for the purpose of improving the understanding of the background of the present invention, and should not be taken as acknowledging that they correspond to the related art already known to those skilled in the art.

SUMMARY

Embodiments of the present invention have been made keeping in mind problems occurring in the related art. The present invention relates to a caster angle adjustment device for a vehicle. Particular embodiments relate to a caster angle adjustment device for a vehicle that improves the running performance by varying a caster angle according to running modes.

A caster angle adjustment device for a vehicle according to embodiments of the present invention includes a variable lower arm connected to multiple points of a subframe via connection parts and connected to a steering knuckle at a single point via a connection part, any one of the connection parts connected to the subframe being movably connected to the subframe to be changed in shape, and an actuator provided in the subframe and connected to the connection part movably connected to the subframe to move a position of the connection part, so that a position of the steering knuckle is moved through the shape change of the variable lower arm to change a caster angle.

The connection parts may include a first connection part moved when the actuator is driven, a second connection part spaced apart from the first connection part, and a third connection part provided in the steering knuckle. The variable lower arm may include a lateral arm having one end connected to the subframe via the first connection part and the other end connected to the steering knuckle via the third connection part, and a guide arm having one end connected to the subframe via the second connection part and the other end rotatably connected to the lateral arm.

The actuator may include a driving part transmitting power during operation, and a rod part receiving the power from the driving part to be retracted and extended in a front and rear direction of the vehicle, and the first connection part may be movably provided in the subframe in the front and rear direction of the vehicle so that a position of the first connection part is moved in the front and rear direction when the actuator is driven.

The guide arm may have the other end rotatably connected to the one end of the lateral arm in a front and rear direction.

The first connection part may include an inner cylinder and an outer cylinder, and an elastic body provided between the inner cylinder and the outer cylinder, and the actuator is connected to the inner cylinder and the one end of the lateral arm is connected to the outer cylinder.

A guide slot extended in the front and rear direction to allow the first connection part to move, and an opening hole opened to be extended in the front and rear direction to allow the lateral arm to pass to the outside in the guide slot, may be provided in an end of the subframe in which the first connection part is provided.

The caster angle adjustment device for a vehicle having the structure as described above has a lower arm configured to include a lateral arm and a guide arm that are rotatably connected to each other, and the lateral arm is changed in position when the actuator is driven, so that the driving characteristics according to the driving mode are changed by the adjustment of the caster angle, thereby improving the driving performance. In addition, since unintended rotational movements of the steering wheel are prevented when the caster angle is adjusted, the unintentional change of the steering wheel can be minimized, and thus a predetermined running characteristic can be maintained.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF ILLUSTRATIVE EMBODIMENTS

Hereinafter, a caster characteristic adjusting apparatus for a vehicle according to an exemplary embodiment of the present invention will be described with reference to the accompanying drawings.

Figure 1:
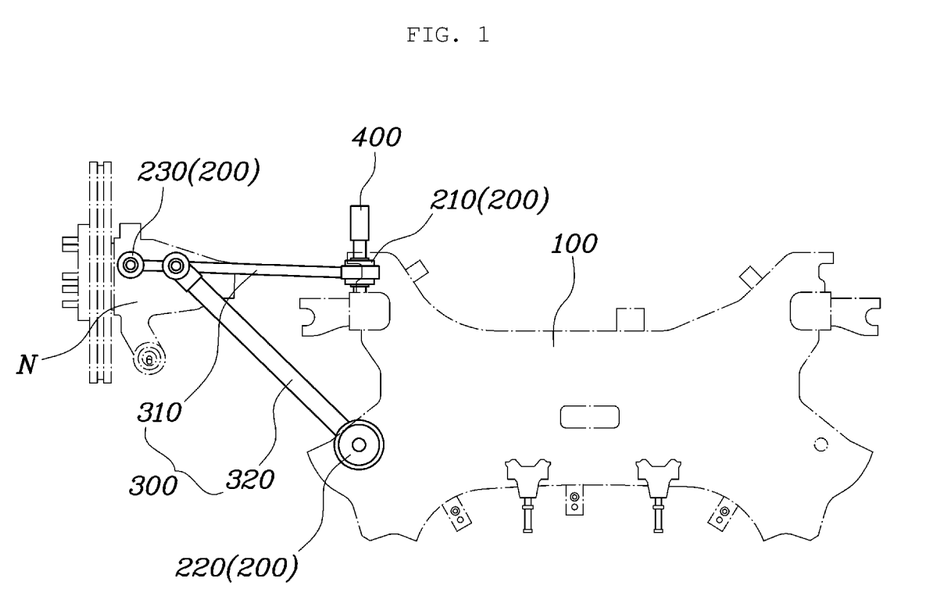
FIG. 1 is a view illustrating a caster angle adjustment device for a vehicle according to embodiments of the present invention.
Figure 2:
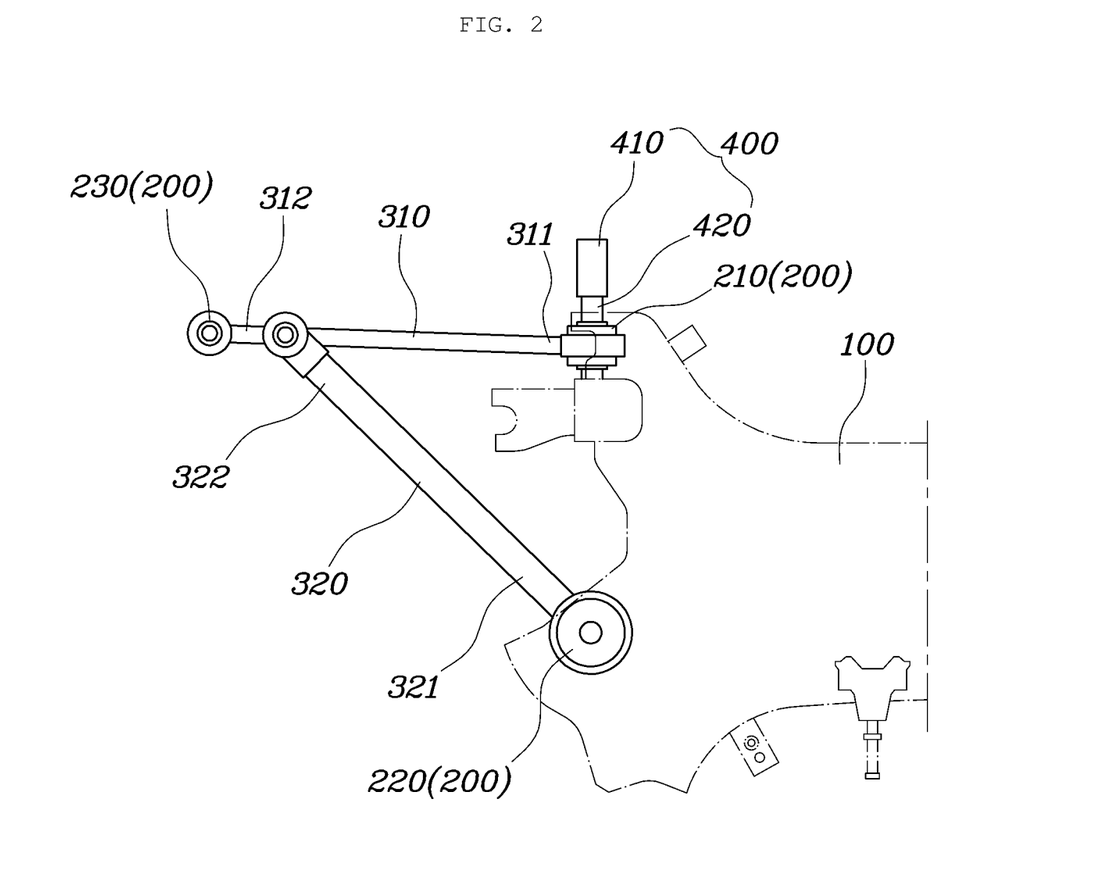
FIGS. 2 to 4 are views illustrating the caster angle adjustment device for a vehicle shown in FIG. 1.
Figure 3:
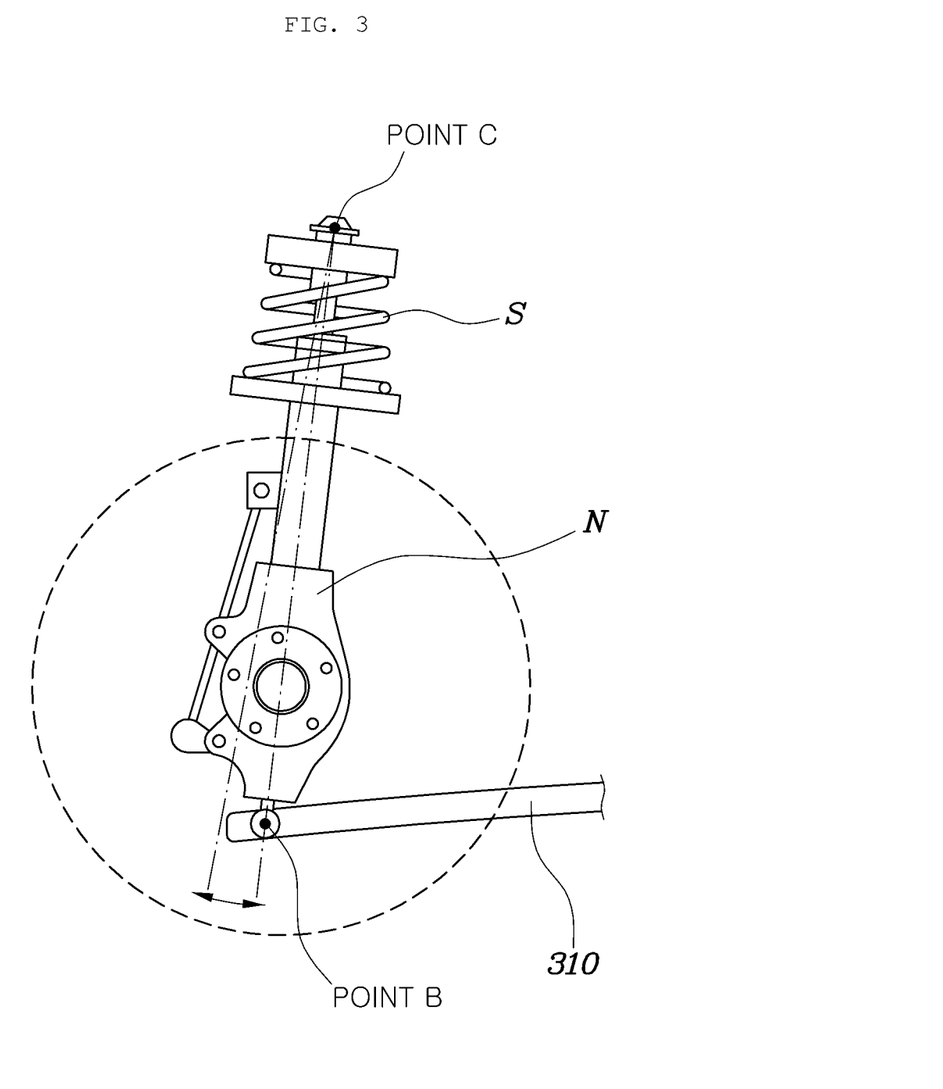
Figure 4:
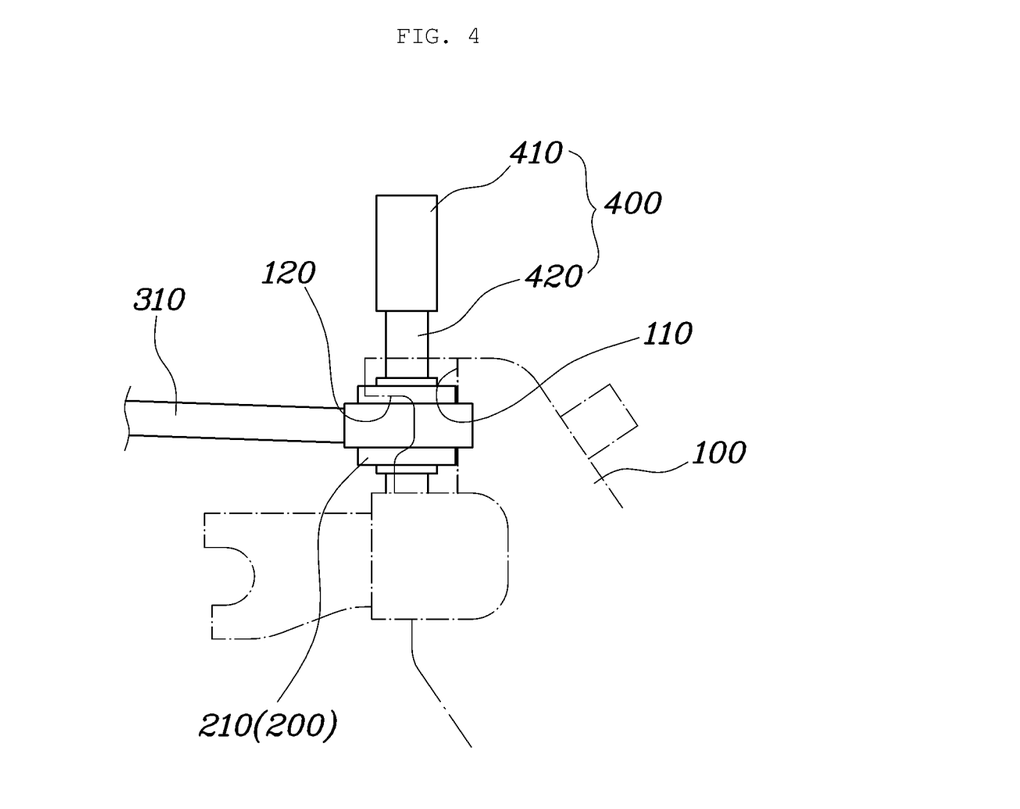
Figure 5:
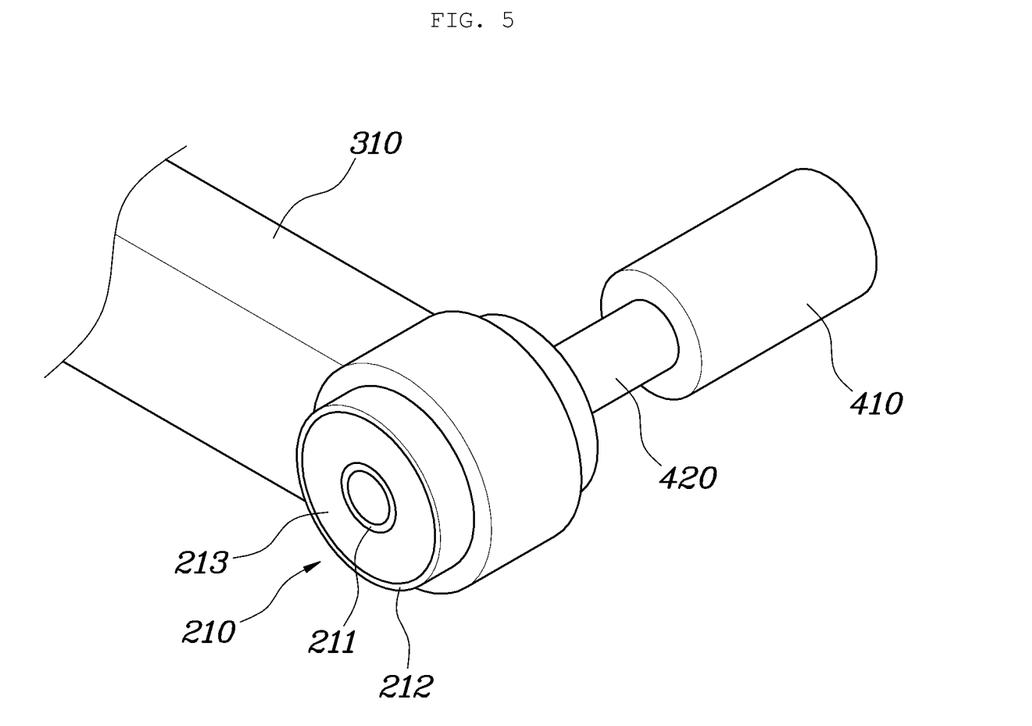
FIG. 5 is a view illustrating a connection structure between a first connection part and an actuator.
Figure 6:
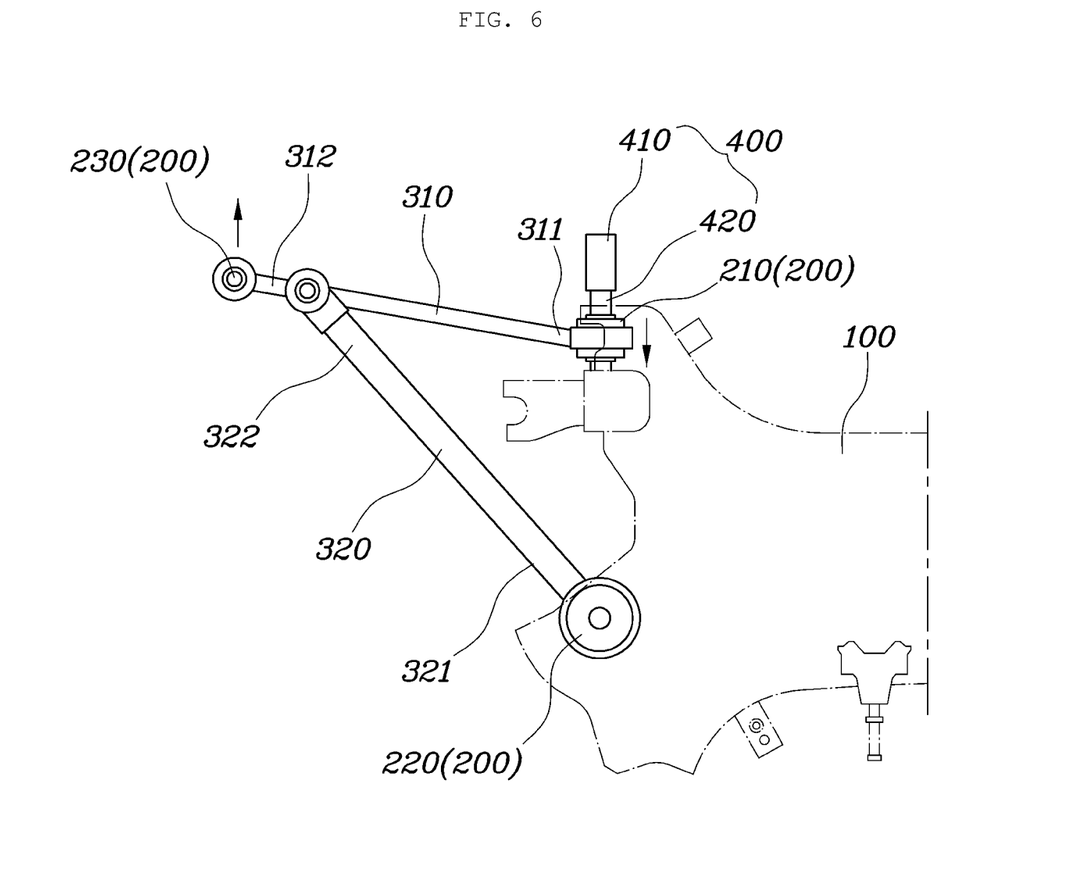
FIG. 6 is a view illustrating the operation of the caster angle adjustment device for a vehicle shown in FIG. 1.

FIG. 1 is a view illustrating a caster angle adjustment device for a vehicle according to embodiments of the present invention; FIGS. 2 to 4 are views illustrating the caster angle adjustment device for a vehicle shown in FIG. 1; FIG. 5 is a view illustrating a connection structure between a first connection part and an actuator; and FIG. 6 is a view illustrating the operation of the caster angle adjustment device for a vehicle shown in FIG. 1.

As shown in FIG. 1, a caster angle adjustment device for a vehicle according to embodiments of the invention includes a variable lower arm 300 connected to multiple points of a subframe 100 via connection parts 200 and connected to a steering knuckle N at a single point via a connection part 200, in which any one of the connection parts 200 connected to the subframe 100 is movably connected to the subframe 100 to be changed in shape. The caster angle adjustment device further includes an actuator 400 provided in the subframe 100 and connected to the connection part 200 movably connected to the subframe 100 to move the position of the connection part 200, so that the position of the steering knuckle N is moved through the shape change of the variable lower arm 300 to change a caster angle.

As described above, embodiments of the present invention include the variable lower arm 300 connected to the subframe 100 and the steering knuckle N and the actuator 400 for adjusting the shape change of the variable lower arm 300. Herein, the variable lower arm 300 is connected to the subframe 100 and the steering knuckle N via the multiple connection parts 200. In particular, the variable lower arm 300 is connected to multiple points of the subframe 100 via the connection parts 200, any one of the connection parts 200 being movably connected to the subframe 100, and is connected to the steering knuckle N at a single point via the connection part 200. For this reason, the variable lower arm 300 may allow the position of the steering knuckle N to be moved as the shape change is introduced during the movement of any one connection part 200.

The actuator 400 is connected to the connection part 200 that is movably connected to the subframe 100. That is, as the position of the connection part 200 movably connected to the subframe 100 is changed when the actuator 400 is driven, the variable lower arm 300 is changed in shape to change the angle of the steering knuckle N. As a result, the caster angle is changed so that the running characteristics are different. The actuator 400 receives instructions from a controller to be driven, the controller collecting information according to a steering wheel, a running situation, a running mode, and the like to control the driving of the vehicle. The controller may control the actuator 400 according to the running situation to adjust the running characteristics, thereby improving the running performance.

Referring to embodiments of the present invention described above in detail, as shown in FIG. 2, the connection part 200 may include a first connection part 210 that is moved when the actuator 400 is driven, a second connection part 220 spaced apart from the first connection part 210, and a third connection part 230 provided in the steering knuckle N. Herein, the first connection part 210 may be a horizontal bush A, the second connection part 220 may be a vertical bush G, and the third connection part 230 may be a ball joint. Accordingly, the variable lower arm 300 may be connected to the subframe 100 and the steering knuckle N via the connection part 200.

Meanwhile, the variable lower arm 300 is configured to include a lateral arm 310 having one end 311 connected to the subframe 100 via the first connection part 210 and the other end 312 connected to the steering knuckle N via the third connection part 230, and a guide arm 320 having one end 321 connected to the subframe 100 via the second connection part 220 and the other end 322 rotatably connected to the lateral arm 310. Herein, the guide arm 320 has the other end 322 pivoted to the one end 311 of the lateral arm 310 using a pillow ball bushing to be rotatably connected in the front and rear direction. Accordingly, when the lateral arm 310 is moved by the driving of the actuator 400, the guide arm 320 guides the movement of the lateral arm 310 to be rotated in the front and rear direction, whereby the position of the steering knuckle N may be moved.

As described above, the variable lower arm 300 is configured to include the lateral arm 310 and the guide arm 320. Since the lateral arm 310 is connected to the subframe 100 via the first connection part 210, the position of the lateral arm 310 is moved when the actuator 400 is driven. Here, since the guide arm 320 is rotatably connected to the lateral arm 310, the one end 311 of the lateral arm 310 is moved by the actuator 400 and the other end 312 of the lateral arm 310 is moved in the direction opposite to the one end 311, whereby the position of the steering knuckle N may be moved along with the third connection part 230. Herein, as the first connection part 210 has a structure of a bush, the rotation of the one end 311 of the lateral arm 310 may be performed by the elastic body of the bush.

That is, as shown in FIG. 3, in the case of McPherson suspension, its caster angle is determined by an upper connection point (point C) of the strut S with the steering knuckle N and a connection point (point B) of the lateral arm 310 to the steering knuckle N. Herein, the caster angle may be adjusted as the position of the steering knuckle (N) is adjusted through mechanical interlocking between the lateral arm 310 and the guide arm 320 when the actuator 400 is driven, thereby changing the running characteristic of the vehicle.

Meanwhile, as shown in FIG. 4, the actuator 400 includes a driving part 410 transmitting power at the time of operation, and a rod part 420 receiving the power from the drive part 410 to be retracted and extended in the front and rear direction of the vehicle, in which the first connection part 210 may be movably provided in the subframe 100 in the front and rear direction of the vehicle, so that the position of the first connection part 210 may be moved in the front and rear direction when the actuator 400 is driven.

Herein, the driving part 410 of the actuator 400 may be configured with a hydraulic or electric motor, and the rod part 420 of the actuator 400 is input and output in the front and rear directions by the operation of the driving part 410 to cause the first connection part 210 to be moved. When the first connection part 210 is moved in the subframe 100 in the front and rear direction, the connection point (point B) of the lateral arm 310 to the steering knuckle N via the third connection part 230 is moved, so that the position of the steering knuckle N may be changed, thereby changing the caster angle. The driving part 410 of the actuator 400 may determine the withdrawal amount of the rod part 420 under the control of the controller.

Meanwhile, as shown in FIG. 5, the first connection part 210 includes an inner cylinder 211 and an outer cylinder 212, and an elastic body 213 provided between the inner cylinder 211 and the outer cylinder 212, in which the actuator 400 may be connected to the inner cylinder 211 and the one end 311 of the lateral arm 310 may be connected to the outer cylinder 212.

The first connection part 210 may be configured with a horizontal bush (A bush) consisting of an inner cylinder 211, an outer cylinder 212, and an elastic body 213. Here, the inner cylinder 211 of the first connection part 210 is connected to the rod part 420 of the actuator 400 and thus moved together with the rod part 420, and the outer cylinder 212 is combined with the lateral arm 310 and thus connected to the steering knuckle N. Accordingly, the lateral arm 310 of the variable lower arm 300 may absorb the vibration through the elastic body 213 of the first connection part 210 and may be rotated by the shape change of the elastic body 213.

Accordingly, the lateral arm 310 coupled to the first connection part 210 is changed in position and rotated by the guide arm 320 by the shape change of the elastic body 213 of the first connection part 210 when the actuator 400 is driven, whereby the position of the steering knuckle N may be changed.

Meanwhile, as shown in FIG. 4, a guide slot no extended in the front and rear direction to allow the first connection part 210 to move, and an opening hole 120 opened to be extended in the front and rear direction to allow the lateral arm 310 to pass to the outside in the guide slot no may be provided, in an end of the subframe 100 in which the first connection part 210 is provided.

As a result, the first connection part 210 may be moved along the guide slot 110 in the subframe 100. In addition, an opening hole 120 is formed in the subframe 100 so that the lateral arm 310 may be connected to the steering knuckle N in the guide slot 110, whereby the lateral arm 310 is connected to the subframe 100 via the first connection part 210. Here, the opening hole 120 is preferably formed longer than the displacement of the lateral arm 310 so that the lateral arm 310 may rotate or move in the front and rear direction.

Therefore, as shown in FIGS. 2 and 6, when the first connection part 210 is moved backwards as the actuator 400 is driven, the lateral arm 310 is also moved backwards. Herein, as the guide arm 320 is pivoted to the lateral arm 310, the other end 312 of the lateral arm 310 is rotated forward when one end 311 of the lateral arm 310 rotates backward. As a result, the steering knuckle N connected to the other end 312 of the lateral arm 310 via the third connection part 230 is moved forward so that the angle of the steering knuckle N is changed, thereby adjusting the caster angle.

Accordingly, the caster angle can be adjusted according to running conditions associated with driving modes (Comfort, Normal, and Sport), steering wheel, ECS, driving force, etc., so that the running performance such as the influence on the road disturbance, the steering reaction force, and the like can be changed.

As a result, the driver can easily change the vehicle characteristics according to the driver's preferences and road conditions, thereby providing various running performances.

The caster angle adjustment device for a vehicle having the structure as described above has a lower arm 300 configured to include a lateral arm 310 and a guide arm 320. The lateral arm 310 and the guide arm 320 are rotatably connected to each other, and the lateral arm 310 is changed in position when the actuator 400 is driven, so that the driving characteristics according to the driving mode are changed by the adjustment of the caster angle, thereby improving the driving performance. In addition, since unintended rotational movements of the steering wheel are prevented when the caster angle is adjusted, the unintentional change of the steering wheel can be minimized, and thus a predetermined running characteristic can be maintained.

While the invention has been shown and described with respect to particular embodiments, it will be apparent to those skilled in the art that the present invention has been variously modified and changed without departing from the spirit of the invention provided by the following claims.

What is claimed is:

1. A caster angle adjustment device for a vehicle, the device comprising:
    a variable lower arm connected to multiple points of a subframe via connection parts and connected to a steering knuckle at a single point via one of the connection parts, any one of the connection parts connected to the subframe being movably connected to the subframe to be changed in shape; and
    an actuator provided in the subframe and connected to the connection part movably connected to the subframe and configured to move a position of the connection part, so that a position of the steering knuckle is moved through the change in shape of the variable lower arm to change a caster angle;
    wherein:
        the connection parts include a first connection part configured to move when the actuator is driven, a second connection part spaced apart from the first connection part, and a third connection part provided in the steering knuckle; and
        the variable lower arm includes a lateral arm having a first end connected to the subframe via the first connection part and a second end connected to the steering knuckle via the third connection part, and a guide arm having a first end connected to the subframe via the second connection part and a second end rotatably connected to the lateral arm;
    wherein the first connection part includes:
        an inner cylinder;
        an outer cylinder; and
        an elastic body provided between the inner cylinder and the outer cylinder; and
    wherein the actuator is connected to the inner cylinder and the first end of the lateral arm is connected to the outer cylinder.

2. The device of claim 1, wherein:
    the actuator includes a driving part configured to transmit power during operation, and a rod part configured to receive the power from the driving part and to be retracted and extended in a front and rear direction of the vehicle; and
    the first connection part is configured to be movably provided in the subframe in the front and rear direction of the vehicle so that the first connection part is configured to be moved in the front and rear direction when the actuator is driven.

3. The device of claim 1, wherein the second end of the guide arm is configured to be rotatably connected to the second end of the lateral arm in a front and rear direction.

4. The device of claim 1, an end of the subframe in which the first connection part is provided comprises:
- a guide slot configured to extend in a front and rear direction to allow the first connection part to move; and
- an opening hole configured to be opened to be extended in the front and rear direction to allow the lateral arm to pass outside in the guide slot.

5. A vehicle comprising:
a subframe; and
a caster angle adjustment device comprising:
- a plurality of connection parts;
- a variable lower arm configured to be connected to multiple points of the subframe via at least two connection parts of the plurality of connection parts and configured to be connected to a single point of a steering knuckle via an additional one of the connection parts, wherein any one of the at least two connection parts connected to the subframe is configured to be movably connected to the subframe, and wherein the variable lower arm is configured to change in shape; and
- an actuator provided in the subframe, wherein the actuator is configured to be connected to the connection part configured to be movably connected to the subframe and is configured to move a position of the connection part configured to be movably connected to the subframe, wherein the steering knuckle is configured to move through the change in shape of the variable lower arm to change a caster angle;

wherein:
the at least two connection parts of the plurality of connection parts include a first connection part configured to move when the actuator is driven and a second connection part spaced apart from the first connection part; and
the additional one of the connection parts includes a third connection part provided in the steering knuckle;

wherein the variable lower arm includes:
- a lateral arm, wherein a first end of the lateral arm is configured to be connected to the subframe via the first connection part and a second end of the lateral arm is configured to be connected to the steering knuckle via the third connection part; and
- a guide arm, wherein a first end of the guide arm is configured to be connected to the subframe via the second connection part and a second end of the guide arm is configured to be rotatably connected to the lateral arm;

wherein the first connection part includes:
- an inner cylinder;
- an outer cylinder; and
- an elastic body provided between the inner cylinder and the outer cylinder; and wherein the actuator is configured to be connected to the inner cylinder and the first end of the lateral arm is configured to be connected to the outer cylinder.

6. The vehicle of claim 5, wherein the actuator includes:
a driving part configured to transmit power during operation; and
a rod part configured to receive the power from the driving part and configured to be retracted and extended in a front and rear direction of the vehicle.

7. The vehicle of claim 6, wherein the first connection part is configured to be movably provided in the subframe in the front and rear direction of the vehicle, and wherein the first connection part is configured to move in the front and rear direction when the actuator is driven.

8. The vehicle of claim 5, wherein the second end of the guide arm is configured to be rotatably connected to the second end of the lateral arm in a front and rear direction.

9. The vehicle of claim 5, wherein the subframe comprises:
- a guide slot configured to extend in a front and rear direction to allow the first connection part to move; and
- an opening hole configured to be opened to be extended in the front and rear direction to allow the lateral arm to pass outside in the guide slot.

10. A method for changing a caster angle, the method comprising:
movably connecting a variable lower arm to a first point of a subframe using a first connection part;
connecting the variable lower arm to a second point of the subframe using a second connection part;
connecting the variable lower arm to a single point of a steering knuckle using a third connection part;
connecting an actuator in the subframe to the first connection part; and
moving the second connection part to move the steering knuckle and change the caster angle;
the variable lower arm including a lateral arm and a guide arm, and the method further comprising:
- connecting a first end of the lateral arm to the subframe using the first connection part;
- connecting a second end of the lateral arm to the steering knuckle using the third connection part;
- connecting a first end of the guide arm to the subframe using the second connection part; and
- rotatably connecting a second end of the guide arm to the lateral arm; and the first connection part including an inner cylinder, an outer cylinder, and an elastic body provided between the inner cylinder and the outer cylinder, and the method further comprising:
- connecting the actuator to the inner cylinder; and
- connecting the first end of the lateral arm to the outer cylinder.

11. The method of claim 10, wherein the actuator includes a driving part and a rod part, the method further comprising:
receiving power by the rod part from the driving part during operation; and
retracting and extending the rod part in a front and rear direction of a vehicle.

12. The method of claim 10, wherein the subframe comprises a guide slot and an opening hole, the method further comprising:
extending the guide slot in a front and rear direction;
opening the opening hole to be extended in the front and rear direction;
connecting the lateral arm to the steering knuckle in the guide slot; and
moving the first connection part along the guide slot.

* * * * *